(12) United States Patent
Ricks

(10) Patent No.: US 8,186,226 B2
(45) Date of Patent: May 29, 2012

(54) PRESSURE SENSOR WITH ON-BOARD COMPENSATION

(75) Inventor: Lamar F. Ricks, Lewis Center, OH (US)

(73) Assignee: Honeywell International Inc., Morristown, NJ (US)

( * ) Notice: Subject to any disclaimer, the term of this patent is extended or adjusted under 35 U.S.C. 154(b) by 355 days.

(21) Appl. No.: 12/634,551

(22) Filed: Dec. 9, 2009

(65) Prior Publication Data
US 2011/0132096 A1 Jun. 9, 2011

(51) Int. Cl.
*G01L 19/04* (2006.01)
(52) U.S. Cl. ............... 73/708; 73/715; 73/721; 73/723; 73/727; 73/754
(58) Field of Classification Search .................. None
See application file for complete search history.

(56) References Cited

U.S. PATENT DOCUMENTS

| | | | | |
|---|---|---|---|---|
| 3,886,799 | A * | 6/1975 | Billette et al. | 73/727 |
| 4,817,022 | A * | 3/1989 | Jornod et al. | 702/98 |
| 4,945,762 | A | 8/1990 | Adamic, Jr. | |
| 5,088,329 | A * | 2/1992 | Sahagen | 73/727 |
| 5,551,304 | A | 9/1996 | Baskett | |
| 5,583,295 | A * | 12/1996 | Nagase et al. | 73/708 |
| 6,150,681 | A | 11/2000 | Allen | |
| 6,621,138 | B1 | 9/2003 | Alter | |
| 6,958,523 | B2 | 10/2005 | Babcock et al. | |
| 7,218,093 | B2 | 5/2007 | Cirkel et al. | |
| 7,918,136 | B2 * | 4/2011 | Muchow et al. | 73/721 |
| 2007/0171589 | A1 | 7/2007 | Otake | |

OTHER PUBLICATIONS

Bitko et al., "Improving the MEMS Pressure Sensor," Sensors, pp. 1-12, Jul. 2000.

* cited by examiner

*Primary Examiner* — Lisa Caputo
*Assistant Examiner* — Jermaine Jenkins
(74) *Attorney, Agent, or Firm* — Seager Tufte & Wickhem LLC

(57) ABSTRACT

The present disclosure relates generally to pressure sensors, and more particularly, to methods and apparatus for compensating pressure sensors for stress, temperature and/or other induced offsets and/or errors. In one illustrative embodiment, a pressure sensor may include a pressure sensing die mounted to a substrate of a pressure sensor package. The pressure sensor die may include on-board compensation. In some instances, the on-board compensation may include an on-board heating element and an on-board zener diode trim network, both situated on or in the pressure sensing die. The zener diode trim network may include one or more zener diodes and one or more resistive elements, where the zener diodes can be selectively activated to "trim" the resistive network to compensate for one or more offsets and/or errors of the pressure sensor. The on-board heating element may be configured to heat the pressure sensor assembly to various temperatures so that temperature related offsets and/or errors may be identified, and then compensated for with the zener diode trim network.

20 Claims, 4 Drawing Sheets

PRESSURE SENSOR WITH ON-BOARD COMPENSATION

FIELD

The present disclosure relates generally to pressure sensors, and more particularly, to methods and apparatus for compensating pressure sensors for stress and/or temperature induced offsets and/or errors.

BACKGROUND

Pressure sensors are used in a wide variety of applications, including for example, commercial, automotive, aerospace, industrial, and medical applications. In many applications, pressure sensors may detect a pressure via a sensing element, often formed on a pressure sensing die, which converts mechanical stress caused by an incoming pressure into an electrical output signal. In these and other types of pressure sensors, undesirable mechanical stresses produced by or within the pressure sensor structure itself can induce errors or offsets in the electrical output signal. In many instances, such errors and offsets can vary with temperature. For example, there may be a miss match between the thermal coefficient of expansion of the substrate of a pressure sensor package and the pressure sensing die, which can produce undesirable mechanical stresses in the pressure sensing die that are temperature dependent. This is just one example, and other undesirable mechanical stresses can and are often applied to the pressure sensing die and cause undesirable errors and offsets in the electrical output signal of the pressure sensor.

What would be desirable are improved and efficient methods for compensating pressure sensors for such stress and/or temperature induced errors and offsets.

SUMMARY

The present disclosure relates generally to pressure sensors, and more particularly, to methods and apparatus for compensating pressure sensors for stress, temperature and/or other induced offsets and/or errors. In one illustrative embodiment, a pressure sensor may include a pressure sensing die mounted to a substrate of a pressure sensor package. The pressure sensor die may include on-board compensation. In some instances, the on-board compensation may include an on-board heating element and an on-board zener diode trim network, both situated on or in the pressure sensing die. More specifically, and in one illustrative embodiment, the pressure sensor die may include a substrate defining a pressure sensing diaphragm, one or more piezoresistive elements disposed on a front side of the substrate adjacent to or on the pressure sensing diaphragm, a zener diode trim network disposed on the first side of the substrate, and an on-board heating element. The zener diode trim network may include one or more zener diodes and one or more resistive elements, where the zener diodes can be selectively activated to "trim" the resistive network to compensate for one or more offsets and/or errors of the pressure sensor. The on-board heating element may be configured to heat the pressure sensor assembly to various temperatures so that temperature related offsets and/or errors may be identified, and then compensated for with the zener diode trim network.

In some cases, the pressure sensor may include an outer housing that includes one or more pressure ports for exposing the pressure sensing die to one or more pressures of interest. In some cases, the pressure sensor may include signal amplification circuitry for amplifying a signal received from the one or more piezoresistive elements. The signal amplification circuitry may be provided on or in the substrate of the pressure sensing die and/or on a separate die such as an Application Specific Integrated Circuit (ASIC).

The preceding summary is provided to facilitate an understanding of some of the innovative features unique to the present disclosure, and is not intended to be a full description. A full appreciation of the disclosure can be gained by taking the entire specification, claims, drawings, and abstract as a whole.

BRIEF DESCRIPTION

The disclosure may be more completely understood in consideration of the following description of various illustrative embodiments in connection with the accompanying drawings, in which.

DESCRIPTION

Figure 1:
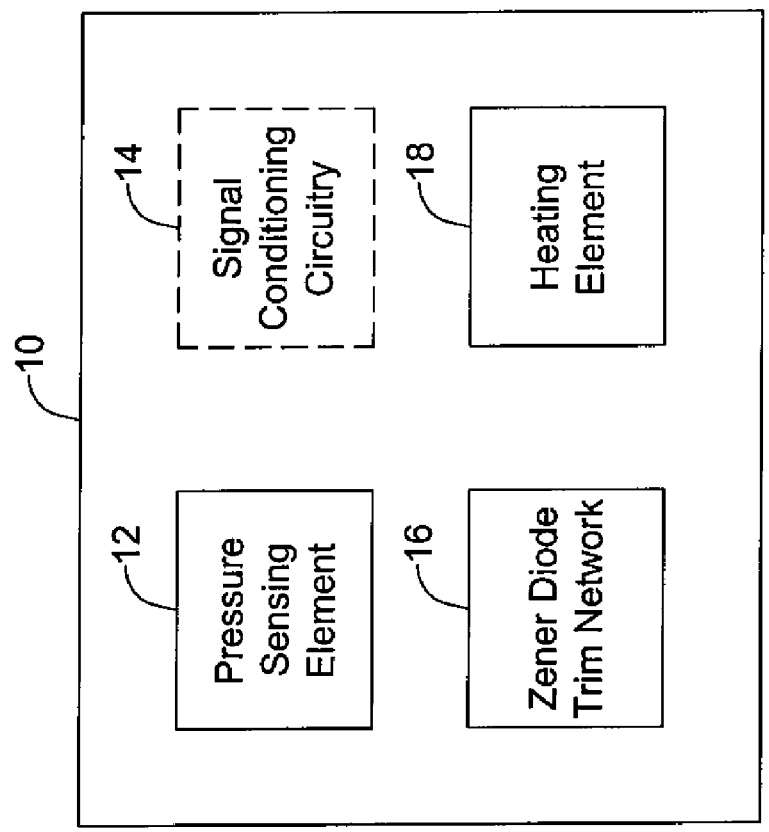
FIG. 1 is a block diagram of an illustrative pressure sensor.

The following description should be read with reference to the drawings wherein like reference numerals indicate like elements throughout the several views. The description and drawings show several embodiments which are meant to be illustrative in nature, and not limiting in any way.

FIG. 1 is a block diagram of an illustrative pressure sensor 10. In the illustrative embodiment, the pressure sensor 10 may include a pressure sensing element 12 for sensing a pressure, optional signal conditioning circuitry 14 for amplifying, conditioning, and/or processing a signal from the pressure sensing element 12, a zener diode trim network 16 for trimming and/or calibrating various error, offsets and/or other parameters of the pressure sensor, and an on-board heating element 18.

In some instances, the pressure sensing element 12 may be a differential pressure sensor, an absolute pressure sensor, a vacuum pressure sensor, a gauge pressure sensor, and/or any other suitable pressure sensor, as desired. A differential pressure sensor may reference two pressures, an absolute pressure sensing element may have an internal vacuum reference pressure, and a gauge pressure sensing element may reference atmospheric pressure or the like. In any event, and in one illustrative embodiment, the pressure sensing element 12 may include a pressure sensitive diaphragm and one or more sensing elements. In one embodiment, the one or more sensing elements may be piezoresistive sensing elements having an electrical resistance that varies according to an applied mechanical pressure applied to the pressure sensitive diaphragm. In some cases, the piezoresistive sensing elements may be disposed on or in a pressure sensing diaphragm that is formed in a pressure sensing die, and the piezoresistive sensing elements may be arranged in a Wheatstone Bridge configuration. In some cases, the piezoresistive sensing elements may include a silicon piezoresistive material, however, non-silicon based materials may be used as desired. It is to be understood that such piezoresistive sensing elements are only illustrative, and it is contemplated that any suitable pressure sensing element(s) may be used including, for example, capacitive, electromagnetic, piezoelectric, or other types of pressure sensing elements, as desired.

In some instances, rather than sensing pressure using a pressure sensing element 12 as shown in FIG. 1, it is contemplated that other or different types of sensors may likewise be employed, such as flow sensors, humidity sensors, position sensors, force sensors, load sensors, and/or or any other suitable sensor, as desired. Thus, it is contemplated that the pressure sensing element 12 shown in FIG. 1 may be replaced or supplemented with a different type of sensor element, such as a flow sensor element, a humidity sensor element, a position sensor element, a force sensor element, a load sensor element and/or any other suitable sensor element, as desired. When so provided, the zener diode network 16 and/or heating element 18 may function in a similar manner as described herein.

In some embodiments, the pressure sensor 10 may include optional signal conditioning circuitry 14. If provided, the optional signal conditioning circuitry 14 may receive a signal from the pressure sensing element 12, and condition and/or process the signal for transmission from the pressure sensor 10. In some cases, the signal conditioning circuitry 14 may be fabricated on the same die as the pressure sensing element 12 or, in other cases, the signal conditioning circuitry 14 may be provided on a separate die or other electronics. In some cases, the separate die may include a microprocessor, a microcontroller, and/or an ASIC (Application Specific Integrated Circuit). For example, in some cases, the signal conditioning circuitry 14 may include amplification, analog-to-digital conversion, offset compensation circuitry, or other suitable conditioning circuitry, as desired.

In the illustrative embodiment of FIG. 1, the pressure sensor 10 includes a zener diode trim network 16 configured to trim the pressure sensor 10 to compensate for temperature and/or stress induced errors and/or offsets, which may include manufacturing variations. This may help improve the accuracy, yield, precision and/or performance of the pressure sensor 10. The zener diode trim network 16 may be configured to adjust one or more electrical parameters of the pressure sensor 10 to bring those parameters within a desired specification. For example, the zener diode trim network 16 may be configured to trim, calibrate and/or compensate the pressure sensor 10 for temperature offsets, sensitivity offsets, amplification offsets, and/or any other offsets or errors, as desired. In one example, the zener diode trim network 16 may be configured to trim, calibrate and/or compensate the pressure sensor 10 for offsets (at a reference condition), temperature coefficient of offset (TCO), sensitivity (at a reference condition), temperature coefficient of sensitivity (TCS), resistance (at a reference condition), and/or a temperature coefficient of resistance (TCR). In some cases, the reference condition may be about 25 degrees Celsius, however, any suitable reference condition may be used. In some cases, the zener diode trim network 16 may be used to compensate for performance variations introduced by the mounting of the pressure sensor 10 within a package. When so provided, it is desirable to trim the zener diode trim network 16 after the pressure sensing element 12 is mounted within a package.

In one embodiment, the zener diode trim network 16 may include one or more zener diodes and one or more resistive elements. In one example, the zener diode trim network 16 may include a string of zener diodes and a corresponding string of resistive elements, where each zener diode is connected in parallel with a respective one of the resistive elements. The zener diodes can also be reverse biased during operation. When trimmed, also referred to as zapped, a selected zener diode "short circuits" so that zero or near zero resistance is across the zapped zener diode and thus corresponding resistor. Zapping the zener diode can effect a desired change, such as, for example, a decrease in the resistance of the zener diode trim network. Thus, the zener diode trim network 16 may have a first resistance prior to trimming and a second, lower resistance after trimming.

In some cases, the zener diode trim network 16 may include one or more test pads for the zener diodes. In some cases, there may be one test pad for each zener zap diode. However, it is contemplated that one test pad may service multiple zener diodes, if desired. When so provided, to zap a selected zener diode, a reverse biased voltage greater than the breakdown voltage may be applied across the zener diode, using one or more test pads. In some cases, the zap voltage may produce a zap current in the range of 50-200 milliamps, and may be applied for a sufficient duration, such as, for example, 1-20 milliseconds, to zap the corresponding zener diode.

In some cases, the pressure sensor 10 may be trimmed at the wafer level, after dicing at the die level, after packaging or assembly of the pressure sensor 10, and/or at any suitable time. If trimming is performed after packaging or assembly, the trimming may compensate for changes in device characteristics caused by the packaging and/or assembly process. In some cases, zener diode trimming may also be performed in the field and, in some cases, may be cheaper and quicker to implement than other forms of trimming. If, for example, the pressure sensor 10 is trimmed after packaging, there may be an electrical connection, such as one or more pins, allowing access to the test pads from outside of the package for applying a zapping current to selected zener diodes.

In the illustrative embodiment of FIG. 1, the pressure sensor 10 may also include an on-board heating element 18. The on-board heating element may be configured to provide a heat source to the pressure sensing die, trim network, and/or conditioning circuitry. The heating element 18 may be configured to heat the pressure sensor 10 when exposed to a current. The heating element 18 may provide an elevated temperature to the pressure sensor 10 in order to, for example, simulate the exposure of the pressure sensor 10 to various temperatures in the field. In some cases, the heating element 18 may be activated with a controlled current or voltage, such that a steady state temperature is reached. In some embodiments, when a steady state temperature is reached, the pressure may be varied, and one or more offsets and/or errors may be determined. The zener diode trim network 16 may then be trimmed (i.e. diodes zapped) to compensate for the various identified offsets and/or errors of the pressure sensor (e.g. temperature coefficient of offset, temperature coefficient of sensitivity, temperature coefficient of resistance, etc.). In some cases, the heating element 18 may be controlled independently, and may include its own bond pad or may be coupled to a pin of a package, as desired.

Figure 2:
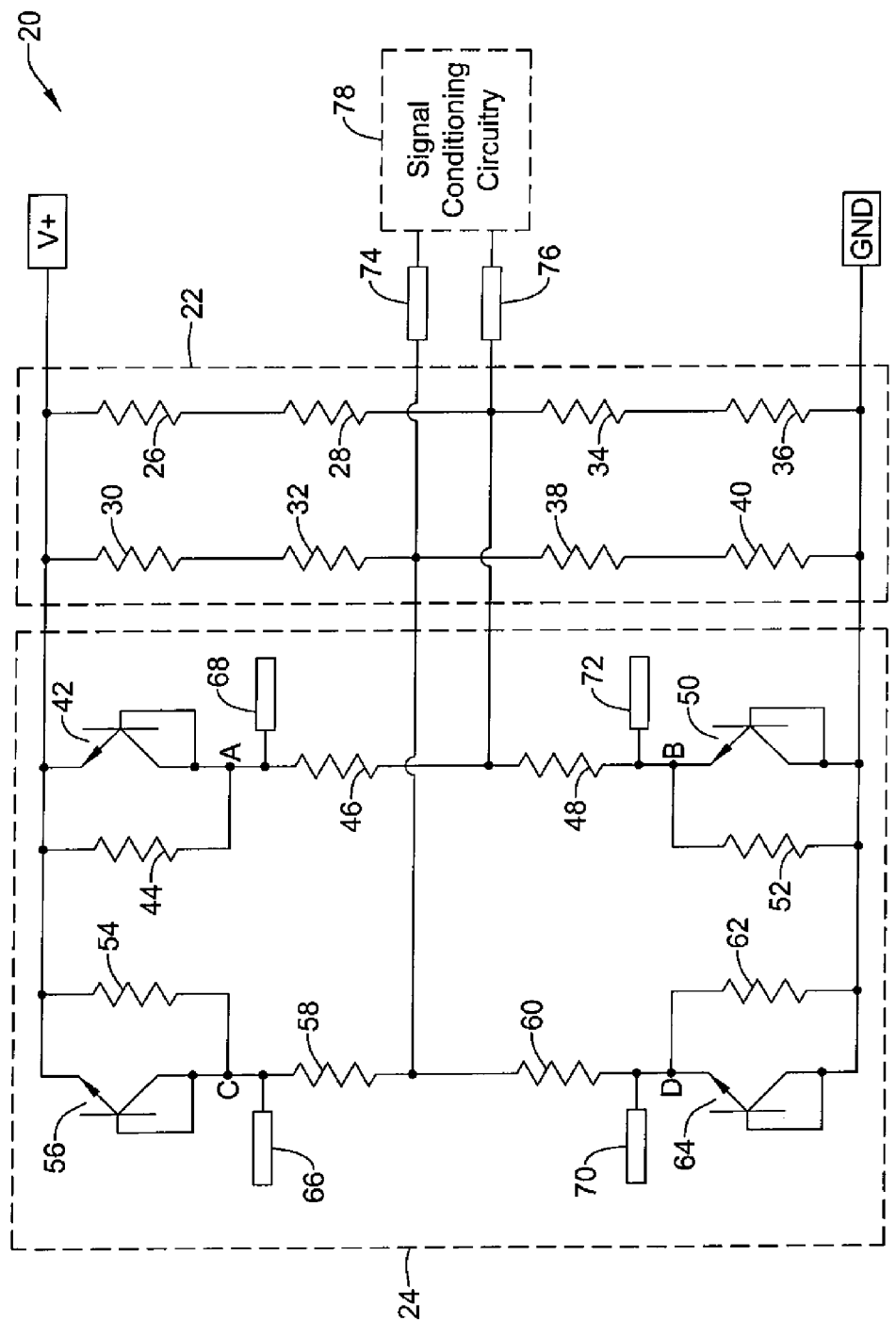
FIG. 2 is a schematic diagram of an illustrative pressure sensing element having a number of piezoresistors, coupled to a zener diode trim network.

FIG. 2 is a schematic diagram 20 of an illustrative pressure sensing element 22 having a number of piezoresistors, coupled to a zener diode trim network 24. The illustrative pressure sensing element 22 includes piezoresistive sensing elements 26, 28, 30, 32, 34, 36, 38, and 40, each having an electrical resistance that varies according to a mechanical stress applied to a pressure sensing diaphragm (shown as 96 in FIG. 3). As illustrated, the piezoresistive sensing elements 26, 28, 30, 32, 34, 36, 38, and 40 are arranged in a Wheatstone Bridge configuration. A first set of piezoresistors including piezoresistors 26 and 28, are connected between a positive voltage supply V+ and a negative output 76 of the bridge. A second set of piezoresistors including piezoresistors 34 and 36 is connected between the negative output 76 of the bridge and ground. A third set of piezoresistors including piezoresistors 30 and 32 is connected between the positive voltage supply V+ and the positive output 74 of the bridge. A fourth set of piezoresistors including piezoresistors 38 and 40 is connected between the positive output 74 of the bridge and ground. While the pressure sensing network 22 is shown and described with two piezoresistors between the power supplies (positive voltage supply V+ and ground) and outputs (positive and negative) of the bridge, it is contemplated that there may be only one piezoresistor, any number of piezoresistors, or any combination of piezoresistors and resistors between the power supplies (positive voltage supply V+ and ground) and outputs (positive and negative) of the bridge.

As shown in FIG. 2, the zener diode trim network 24 is provided in parallel with the pressure sensing element 22. In some embodiments, the zener diode trim network 24 may include one or more zener diodes 42, 50, 56, and 64, and one or more resistors 44, 46, 48, 52, 54, 58, 60, and 62. Each of the zener diodes 42, 50, 56, and 64 is provided in parallel with a corresponding resistor 44, 52, 54, and 62.

In the illustrative embodiment, the zener diodes 42, 50, 56, and 64 are formed as a p-n junction of a relatively heavily doped n+ diffusion and a relatively moderately doped p diffusion. However, any suitable doping may be used, as desired. The doping level in the more lightly doped p-type diffusion usually determines the junction breakdown voltage. As shown, the zener diodes may be constructed using an emitter-base junction of a NPN bi-polar transistor device. In this instance, the base of the NPN bipolar transistor may be connected to the collector. The zener diodes 42, 50, 56, and 64 are also reverse-biased during operation. Applying a reverse-biased voltage across the zener diodes 42, 50, 56, and 64 that is greater than the breakdown voltage may "short circuit" (zap) the emitter-base junction, so that there is a near zero resistance across the zapped zener diode 42, 50, 56, and 64 going forward. The zapping of a zener diode is typically irreversible.

The illustrative zener diode trim network includes zener diode 42 and resistor 44 provided in parallel between the positive voltage supply V+ and node A. Resistor 46 is connected between node A and the negative output 76 of the bridge. Zener diode 50 and resistor 52 are provided in parallel between ground and node B. Resistor 48 is provided between node B and the negative output 76 of the bridge. Zener diode 56 and resistor 54 are provided in parallel between the positive voltage supply V+ and node C. Resistor 58 is provided between node C and the positive output 74 of the bridge. Zener diode 64 and resistor 62 are provided in parallel between ground and node D. Resistor 60 is provided between node D and the positive output 74 of the bridge.

The illustrative zener diode trim network 24 may include one or more test pads, such as test pads 66, 68, 70, and 72, to facilitate the zapping of one or more selected zener diodes 42, 50, 56, and 64. In the illustrative embodiment, there may be a test pad 66, 68, 70, and 72 that corresponds to each of the zener diodes 42, 50, 56, and 64, but this is not required. To zap one of the zener diodes 42, 50, 56, and 64, a corresponding test pad 66, 68, 70, and 72 can be utilized to apply a voltage sufficient to breakdown the corresponding zener diode 42, 50, 56, and 64. In some cases, the zap current for zapping one of the zener diodes 42, 50, 56, and 64 may be in the range of 50-200 milliamps. The zap current may also be applied for a sufficient duration, such as, for example, 1-20 milliseconds. Zapping one or more of the zener diodes 42, 50, 56, and 64 may decrease the resistance across the zener diode trim network 24.

In the illustrative embodiment of FIG. 2, the positive output 74 of the bridge and the negative output 76 of the bridge may be connected to optional signal conditioning circuitry 78. If provided, the signal conditioning circuitry 78 may receive the output signal from the pressure sensing network 22 and zener diode trim network 24 and condition and/or process the signal for transmission from the pressure sensor. In some cases, the signal conditioning circuitry 78 may be fabricated on the same die as the pressure sensing network 22 and zener diode trim network 24 or, in other cases, the signal conditioning circuitry 78 may be provided on a separate die or other electronics, such as a microprocessor, microcontroller, and/or ASIC (Application Specific Integrated Circuit). In some cases, the signal conditioning circuitry 78 may include amplification, analog-to-digital conversion, offset compensation circuitry, and/or other suitable conditioning circuitry.

Figure 3:
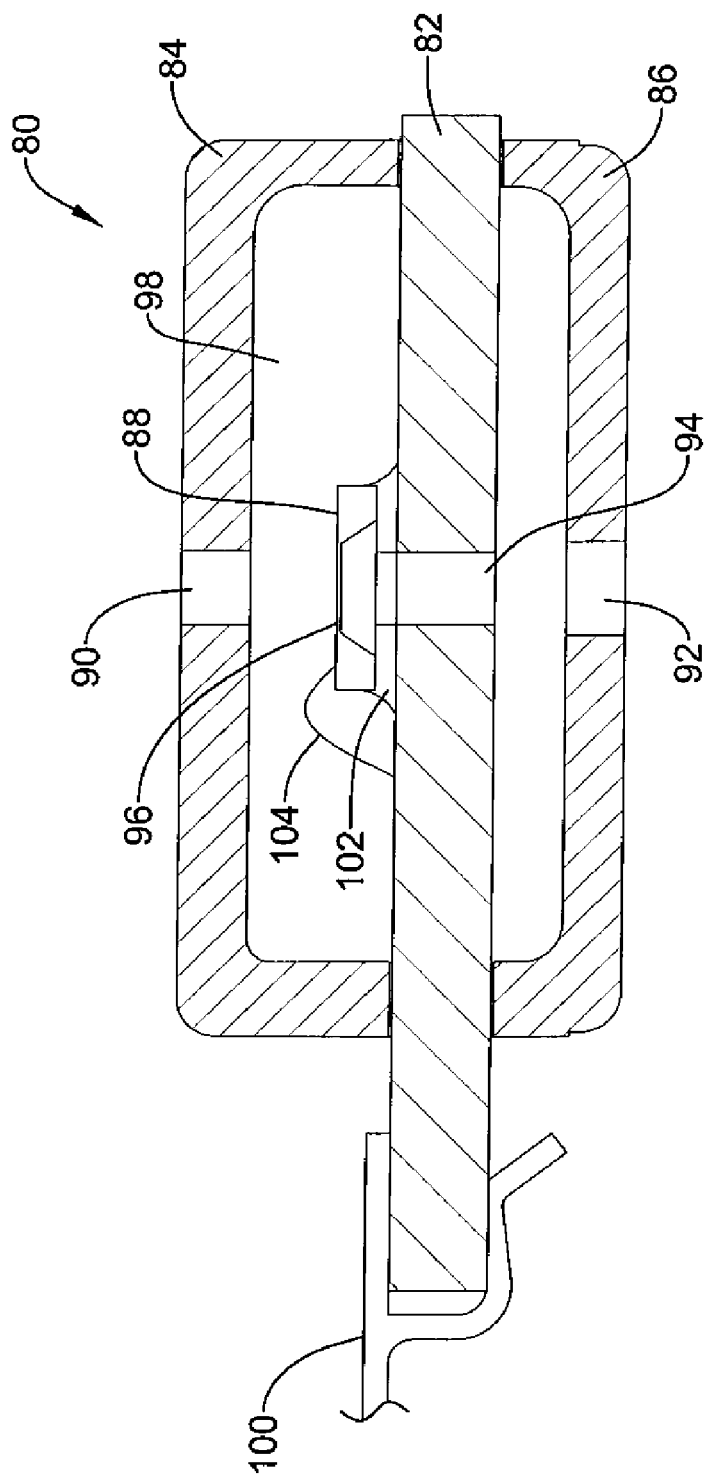
FIG. 3 is a cross-sectional view of an illustrative monolithic pressure sensor having an on-board heater and a zener diode trim network.

FIG. 3 is a cross-sectional view of an illustrative monolithic pressure sensor 80 having an on-board heater and a zener diode trim network. In the illustrative embodiment, the pressure sensor 80 may include a pressure sensing die 88 mounted on a package substrate 82. The package substrate 82 may include a ceramic material, however, other suitable material may be used as desired. In some cases, the pressure sensing die 88 may be mounted to the substrate 82 using an adhesive 102 or other suitable bonding mechanism. In some cases, the pressure sensing die 88 may be fabricated using a silicon wafer and suitable fabrication techniques.

In the illustrative monolithic pressure sensor 80, the pressure sensing elements 12, zener diode trim network 16, heating element 18, and optional signal conditioning circuitry 14 (e.g. amplifier) may be provided on or in the pressure sensing die 88 using suitable fabrication or printing techniques. In some cases, the pressure sensing die 88 may include a pressure sensing diaphragm 96 for sensing a pressure differential between a top and bottom side of the pressure sensing die 88. In some cases, the pressure sensing diaphragm 96 may be fabricated by back-side etching a silicon die 88, however, any suitable process may be used, as desired. In some cases, the package substrate 82 may include an opening 94 to expose the bottom or back side of the pressure sensing diaphragm 96 to the bottom side of the package substrate 82.

In the illustrative embodiment, an outer protective housing of the pressure sensor 80 may be provided. The protective housing may include a top protective cover 84 and a bottom protective cover 86, defining a cavity 98 for the pressure sensing die 88. As illustrated, the top protective cover 84 is disposed on a top side of the substrate 82 to protect the pressure sensing die 88. The bottom protective cover 86 is disposed on a bottom side of the substrate 82. With such a configuration, the top and bottom protective covers 84 and 86 may protect the pressure sensing element 88, heating element, zener diode trim network, and any optional signal conditioning circuitry. In some cases, the top protective cover 84 and the bottom protective cover 86 may be formed from, for example, plastic. However, it is contemplated that any other suitable material may be used, as desired.

As illustrated in FIG. 3, the top protective cover 84 may include a pressure input port 90 for exposing the pressure sensing element (e.g. pressure sensing diaphragm 96) to a first input pressure. In some cases, the bottom protective cover 86 may also include a pressure input port 92 for exposing the pressure sensing element (e.g. pressure sensing diaphragm 96) to a second input pressure. The pressure sensing element may be configured to sense a pressure differential between the pressure input port 90 and pressure input port 92. A signal corresponding to the sensed pressure difference may be transmitted to the optional signal conditioning circuitry for conditioning. While the foregoing pressure sensor 80 is shown as a differential or gauge pressure sensor, it is contemplated that the housing may only include one of ports 90 and 92 for absolute or vacuum pressure sensor applications, as desired.

In the illustrative embodiment, the pressure sensor 80 may include one or more electrical leads 100 mounted to the package substrate 82 and electrically connected to any optional signal conditioning circuitry or the pressure sensing element and/or zener diode trim network via one or more leads 104, for receiving a signal corresponding to the pressure sensed by the pressure sensing element (e.g. pressure sensing diaphragm 96). In some cases, the one or more electrical leads 100 may include a metal, however, any suitable material may be used, as desired, including conductive polymers.

Figure 4:
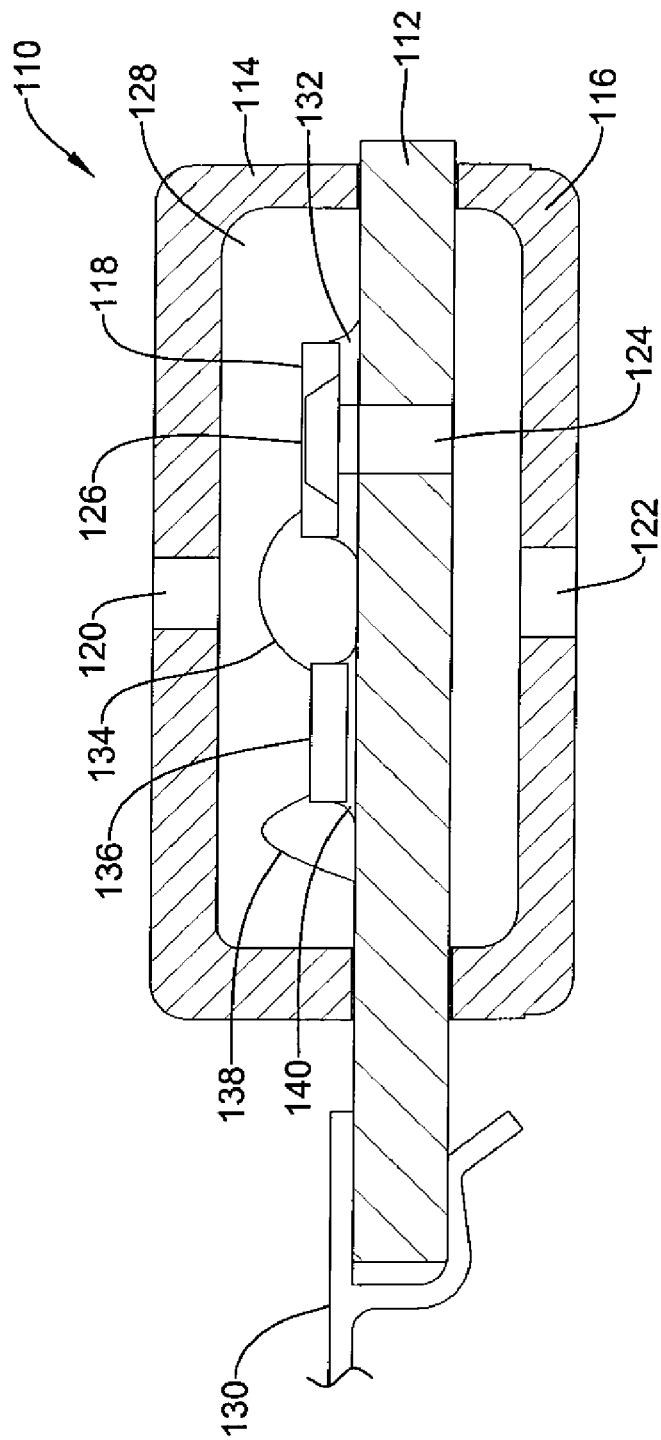
FIG. 4 is a cross-sectional view of another illustrative pressure sensor having an on-board heater and a zener diode trim network.

FIG. 4 is a cross-sectional view of another illustrative pressure sensor 110 including an on-board heater and a zener diode trim network. In the illustrative embodiment, the pressure sensor 110 may include a pressure sensing die 118, and ASIC die 136 both mounted on a package substrate 112. The package substrate 118 may include a ceramic material, however, other suitable types of material may be used, as desired. In some cases, the pressure sensing die 118 and ASIC die may be mounted to the package substrate 112 using an adhesive 132 and 140, or any other suitable bonding mechanism (e.g. solder, eutectic, etc.).

In the illustrative monolithic pressure sensor 110, the pressure sensing elements 12, zener diode trim network 16, and heating element 18 may be provided on the pressure sensing die 118 using suitable fabrication or printing techniques. In some cases, the pressure sensing die 118 may include a pressure sensing diaphragm 126 for sensing a pressure differential between a top and bottom side of the pressure sensing die 118. In some cases, the package substrate 112 may include an opening 124 to expose the bottom side of the pressure sensing diaphragm 126 to the bottom side of the package substrate 112.

In the illustrative embodiment, an outer protective housing of the pressure sensor 110 may include a top protective cover 114 and a bottom protective cover 116, defining a cavity 128 for the pressure sensing die 118. As illustrated, the top protective cover 114 is disposed on a top side of the package substrate 112 to protect the pressure sensing die 118. The bottom protective cover 116 is disposed on a bottom side of the package substrate 112. With such a configuration, the top and bottom protective covers 114 and 116 may protect the pressure sensing element, heating element, zener diode trim network, and any signal conditioning circuitry. In some cases, the top protective cover 114 and the bottom protective cover 116 may be formed from, for example, plastic. However, it is contemplated that any other suitable material may be used, as desired.

As illustrated in FIG. 4, the top protective cover 114 may include a pressure input port 120 for exposing the pressure sensing element (e.g. pressure sensing diaphragm 126) to a first input pressure. The bottom protective cover 116 includes a pressure input port 122 for exposing the pressure sensing element (e.g. pressure sensing diaphragm 126) to a second input pressure. The pressure sensing element may be configured to sense a pressure differential between the pressure input port 120 and pressure input port 122. A signal corresponding to the sensed pressure difference may be transmitted to the signal conditioning circuitry for conditioning. While the foregoing pressure sensor 110 is shown as a differential or gauge pressure sensor, it is contemplated that the housing may only include one of ports 120 and 122 for absolute or vacuum pressure sensor applications, if desired.

In the illustrative embodiment, the pressure sensor 110 may include one or more electrical leads 130 mounted to the substrate 112 and electrically connected to the signal conditioning circuitry of ASIC die 136 via one or more leads 138 for receiving a conditioned signal corresponding to the pressure sensed by the pressure sensing element. ASIC die 136 may be electrically connected to the pressure sensing die 118 via one or more leads 134 for receiving an unconditioned signal corresponding to the pressure sensed by the pressure sensing element (e.g. pressure sensing diaphragm 126). While ASIC die 136 is shown, it is contemplated that die 136 may include any suitable microprocessor or microcontroller, as desired. In some cases, the one or more electrical leads 130 may include a metal, however, any suitable material may be used, as desired, such as conductive polymers.

For illustrative purposes, the foregoing description has been described with reference to a pressure sensor. However, this is not meant to be limiting in any manner. It is contemplated that the features of the foregoing description may be incorporated into any suitable sensor, such as, for example, temperature sensor, flow sensors, humidity sensors, position sensors, force sensors, load sensors, as well as any other type of sensor that may be trimmed or calibrated.

This disclosure should not be considered limited to the particular examples described herein. Various modifications, equivalent processes, as well as numerous structures to which the disclosure can be applicable will be readily apparent to those of skill in the art upon review of the instant specification.

What is claimed is:

1. A pressure sensor, comprising:
   a package substrate including a first side and a second side;
   a pressure sensing die mounted relative to the first side of the package substrate, the pressure sensing die including:
      a pressure sensing diaphragm;
      one or more piezoresistive elements disposed on or adjacent to the pressure sensing diaphragm, wherein the one or more piezoresistive elements have a resistance that varies with an applied pressure to the pressure sensing diaphragm;
      a zener diode trim network, wherein the zener diode trim network includes one or more zener diodes and one or more resistive elements, wherein the zener diode trim network is configured to be trimmed to compensate for one or more errors and/or offsets of the pressure sensor;
      an on-board heating element, wherein the on-board heating element is configured to heat the pressure sensor when a current is applied to the heater element; and
   a housing including a first housing member and a second housing member, the first housing member is mounted on the first side of the package substrate, the second housing member is mounted on the second side of the package substrate, wherein at least one of the first housing member and the second housing member has a pressure port for exposing the pressure sensing diaphragm of the pressure sensing die to a first input pressure.

2. The pressure sensor of claim 1, wherein the first housing member and the second housing member each have a pressure port for exposing the pressure sensing diaphragm to the first input pressure and a second input pressure, respectively.

3. The pressure sensor claim 1, wherein the first housing member has a pressure port for exposing a first side of the pressure sensing diaphragm to the first input pressure, and the second housing member is sealed to the package substrate to provide a reference pressure to a second side of the pressure sensing diaphragm.

4. The pressure sensor of claim 1, wherein the pressure sensor includes an amplification circuit for amplifying a signal received from the one or more piezoresistive elements.

5. The pressure sensor of claim 4, wherein the pressure sensing die is monolithic.

6. The pressure sensor of claim 1, wherein the pressure sensing die is monolithic.

7. The pressure sensor of claim 1, further comprising an application specific integrated circuit (ASIC) die mounted relative to the package substrate, wherein the ASIC doe includes signal conditioning circuitry for conditioning a signal received from the pressure sensing die.

8. The pressure sensor of claim 1, wherein the zener diodes of the zener diode trim network are reverse biased during operation.

9. The pressure sensor of claim 8, wherein each of the zener diodes are provided in parallel with at least one of the resistor elements.

10. The pressure sensor of claim 1, wherein the one or more zener diodes are NPN bipolar transistors with the base connected to the collector.

11. The pressure sensor of claim 10, wherein trimming the zener diode trim network includes applying a voltage greater than a breakdown voltage of one or more zener diodes to affect a desired change in resistance of the zener diode trim network.

12. A pressure sensor, comprising:
a pressure sensing die having a front side and a back side, wherein the back side is etched to form a pressure sensing diaphragm;
one or more piezoresistive elements disposed on or in the front side of the pressure sensing die on or adjacent to the pressure sensing diaphragm, wherein the one or more piezoresistive elements have a resistance that varies with an applied pressure to the pressure sensing diaphragm;
a trim network disposed on the first side of the pressure sensing die, wherein the trim network is configured to compensate for one or more errors and/or offsets in the pressure sensor when the trim network is trimmed, wherein the trim network has a first resistance prior to being trimmed and a second resistance after being trimmed, wherein the second resistance is less than the first resistance; and
an on-board heating element, wherein the on-board heating element is configured to heat the pressure sensing die when a current is applied to the heating element.

13. The pressure sensor of claim 12, further comprising;
an amplification circuit for amplifying a signal received from the one or more piezoresistive elements.

14. The pressure sensor of claim 12, further comprising:
a housing including one or more pressure ports for exposing the pressure sensing diaphragm to one or more pressures.

15. The pressure sensor of claim 12, wherein the trim network includes one or more zener diodes and one or more resistive elements, wherein the zener diodes of the trim network are reverse biased during operation.

16. The monolithic pressure sensor of claim 15, wherein the each of the zener diodes are provided in parallel with at least one of the resistor elements.

17. A method of compensating a pressure sensor for temperature induced errors and/or offsets, the method comprising:
providing a pressure sensor including a pressure sensing die defining a pressure sensing diaphragm, one or more piezoresistive elements disposed on the pressure sensing die on or adjacent to the pressure sensing diaphragm, a trim network disposed on the pressure sensing die, wherein the trim network is configured to compensate for one or more errors and/or offsets in the pressure sensor when the trim network is trimmed, wherein the trim network has a first resistance, and an on-board heating element, wherein the on-board heating element is configured to heat the pressure sensor when a current is applied;
activating the on-board heating element to heat the pressure sensor to a raised temperature; and
when the temperature of the pressure sensor reaches the raised temperature, decreasing the resistance of the trim network to a second resistance to compensate for temperature induced errors and/or offsets of the pressure sensor, the second resistance being lower than the first resistance.

18. The method of claim 17, further comprising:
providing an amplification circuit for amplifying a signal received from the one or more piezoresistive elements; and
decreasing the resistance of the trim network to a third resistance to compensate for amplification errors and/or offsets of the pressure sensor, the third resistance lower than the first resistance.

19. The method of claim 17, wherein the trim network includes one or more zener diodes and one or more resistive elements wherein the one or more zener diodes of the trim network are reverse biased during operation.

20. The method of claim 19, wherein decreasing the resistance of the trim network includes applying a voltage across one or more zener diodes of the trim network that is greater than the breakdown voltage of the one or more zener diodes to breakdown the one or more zener diodes, thereby shorting out one of the resistive elements.

* * * * *